3,284,320
SEPARATION OF MIXTURES OF ALKYL MONO-BROMIDES AND HYDROCARBONS BY EXTRACTIVE DISTILLATION WITH A DI-ESTER OF PHTHALIC ACID
Loyd W. Fannin, Creve Coeur, and Charles H. Middlebrooks, St. Louis, Mo., assignors to Monsanto Company, a corporation of Delaware
Filed June 10, 1963, Ser. No. 286,801
9 Claims. (Cl. 203—60)

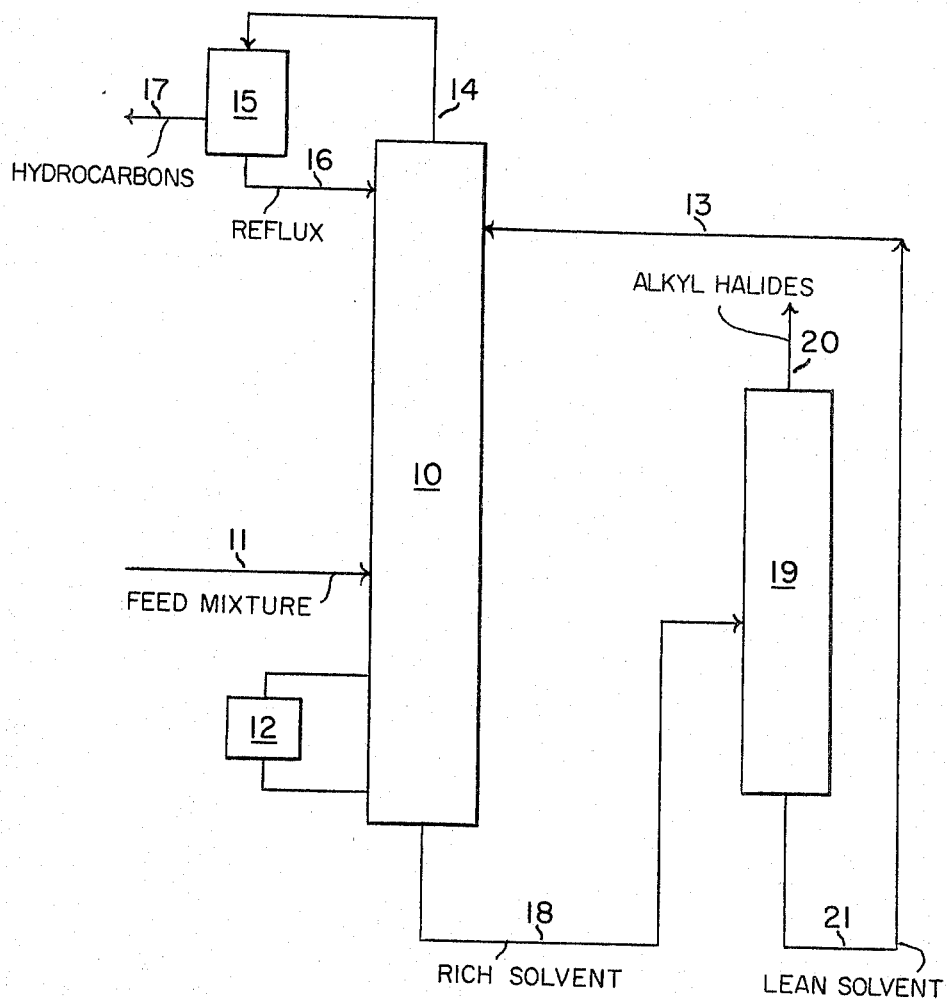

The present invention relates to the separation of organic compounds by extractive distillation. More particularly, the present invention relates to a process for the separation of alkyl halides from hydrocarbons by extractive distillation and to the solvent useful therein.

It is an object of the present invention to provide an extractive distillation process for the separation of organic compounds. Another object of the present invention is to provide an extractive distillation process for the separation of alkyl halides from hydrocarbons. A further object of the present invention is to provide a solvent for the separation of alkyl halides from hydrocarbons by extractive distillation. Additional objects of the present invention will become apparent from the following description of the invention herein disclosed.

In fulfillment of these and other objects, it has been found that a mixture of alkyl halides and hydrocarbons which are difficultly separable therefrom can be effectively separated into a fraction substantially richer in hydrocarbon concentration than the original mixture and another fraction substantially richer in alkyl halide concentration than the original mixture by extractively distilling said mixture in the presence of a solvent comprising a di-ester of phthalic acid. The distillate fraction obtained as overhead from this distillation is substantially richer in hydrocarbon concentration than is the original mixture. The alkyl halide rich solvent fraction obtained as bottoms is subjected to distillation or other separation means and a fraction substantially richer in alkyl halide concentration recovered therefrom.

This invention provides, in a preferred embodiment, a process which comprises continuously introducing a feed mixture comprised of alkyl halides and hydrocarbons which are difficultly separable therefrom into an intermediate section of a fractionating column, continuously introducing a solvent into the fractionating column at a point above the point of introduction of the feed mixture, so that the solvent flows countercurrent to and intimately contacts the ascending vapors of the feed mixture, withdrawing overhead hydrocarbons substantially free of alkyl halides and removing from the bottom section of said column a fraction comprised of alkyl halide and said solvent, said solvent introduced into said fractionating column being a di-ester of phthalic acid.

The present invention is further illustrated by the accompanying schematic diagram of an embodiment of the invention. Referring to the drawing, a feed mixture comprising alkyl halides and hydrocarbons which are difficultly separable therefrom is introduced into a fractionating column 10 by means of line 11. Liquids are vaporized in the lower part of column 10 by heat supplied by reboiler 12. The solvent is introduced in the column in the liquid phase through line 13 which is located at a point in fractionating column 10 above line 11. The solvent flows downward through column 10, countercurrently contacting upwardly flowing vapors of the feed mixture. The unabsorbed portion of the feed mixture is removed from fractionating column 10 by means of line 14 and passed through condenser 15 in which it is liquefied. A portion of the liquefied material is returned to column 10 as reflux through line 16 and the remaining portion comprising hydrocarbons substantially free of alkyl halides recovered through line 17. The solvent enriched with absorbed alkyl halides is removed from column 10 by means of line 18 and is passed into distillation column 19 in which the alkyl halides are separated from the solvent. The alkyl halides exit distillation column 19 by line 20 and the solvent passes from distillation column 19 and is returned to fractionating column 10 by means of lines 21 and 13.

To further describe and to illustrate the present invention, the following examples are presented. These examples are in no way to be construed as limiting to the present invention.

Example I

A mixture of hexene-2 and 2-bromopropane was placed in a distillation flask equipped with a condenser. To this mixture was added o-dimethylphthalate in an amount sufficient to provide a 4:1 solvent to feed ratio. The composition of the feed was approximately 56.6 mol percent 2-bromopropane and 43.4 mol percent hexene-2. This distillation arrangement was of approximately one theoretical plate efficiency. The solvent-feed mixture was subjected to distillation and an overhead distillate obtained. This distillate was found to have the composition 44.4 mol percent 2-bromopropane and 55.6 mol percent hexene-2.

Example II

A 1 inch diameter Oldershaw fractionating column of approximately 45 trays is employed in separating an alkyl halide-hydrocarbon mixture according to the present invention. The alkyl halide-hydrocarbon feed mixture is comprised of 10% by weight 1-bromopropane (boiling point 71° C.), 2% by weight 2-bromopropane (boiling point 60° C.) and 88% by weight of a mixture of straight-chain and methyl substituted hexenes (boiling point 58–68° C.). The feed mixture is introduced into the Oldershaw column at a point 10 trays from the bottom of the column at a rate of 0.36 liters per hour. o-Dimethylphthalate is introduced into the fractionating column at a point 40 trays from the bottom of the column at a rate such as to cause a 3:1 solvent to feed ratio. The column is operated with a 1:1 reflux ratio. The distillate obtained overhead is substantially free of bromopropanes. The solvent-bromopropane mixture is continuously taken from the bottom of the column and subjected to a flash distillation from which bromopropanes substantially free of hexenes are obtained.

Example III

A mixture of 2-bromohexane and nonenes are placed in a distillation flask equipped with a condenser. To this mixture is added o-dipropylphthalate in an amount sufficient to provide a 4:1 solvent to feed ratio. The composition of the feed is approximately 55 mol percent 2-bromohexane and 45 mol percent nonene. This distillation arrangement is of approximately one theoretical plate efficiency. The solvent feed mixture is subjected to distillation and an overhead distillate obtained. The distillate has a substantially higher concentration of nonene than the original mixture.

The solvents within the scope of the present invention are diesters of phthalic acid. Such compounds have the formula

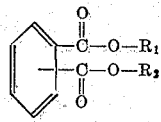

wherein both $R_1$ and $R_2$ are alkyl groups. $R_1$ and $R_2$ may be like or unlike in structure. For example $R_1$ may be an alkyl group of 2 carbon atoms while $R_2$ may be an alkyl group of 6 carbon atoms. Generally, the alkyl group will contain 1 to 10 carbon atoms, but more often 1 to 6 carbon atoms. The alkyl groups may be straight-chain or branched-chain though it is preferred that they be straight-chain. Several non-limiting examples of solvents of the present invention are dimethylphthalate, dibutylphthalate, dihexylphthalate, diethylhexylphthalate, diethylphthalate, dipropylphthalate, dipentylphthalate. The present solvents include not only the ortho-di-esters of phthalic acid but also the meta and para di-esters of phthalic acid. The ortho-di-esters are the preferred di-esters with the ortho-di-esters in which $R_1$ and $R_2$ contain 1 to 3 carbon atoms being the preferred ortho-di-esters. These include o-dimethylphthalate, o-diethylphthalate, o-dipropylphthalate, o-methylethylphthalate, o-ethylpropylphthalate, and o-methylpropylphthalate.

The di-esters of phthalic acid may be used singly or in combination one with another. Also, they may be used in conjunction with auxiliary solvents such as co-solvents, modifying solvents, or anti-solvents. When used with an auxiliary solvent, the di-esters of phthalic acid generally will be present in an amount of 50 to 99% by weight of the solvent mixture.

Any conventional distillation equipment may be used in practicing the invention disclosed herein. The present invention may be carried out either by batch distillation as illustrated in Example I or continuous distillation methods as illustrated by Example II. Any conventional fractionating equipment may be used. The fractionation unit may be a packed column or it may be a column equipped with perforated plates, bubble trays, or a system of baffles. The number of theoretical plates in the fractionating unit will depend upon the efficiency of separation desired, the precise composition of the feed mixture, the quantity of solvent, the reflux ratio, and other related factors well known to those skilled in the art. The theoretical plate efficiency may be as low as one, as illustrated by Example I, and may be as high as 100 and higher. The preferred fractionating column is one providing for countercurrent liquid-vapor contact under reboiling and refluxing conditions and, generally, will have a theoretical plate efficiency of 25 to 50.

In practicing the present invention according to its preferred mode of practice, the feed mixture is introduced into the fractionating column at a point approximate to or below the mid point of the fractionating column while the solvent is introduced above the entry point of the feed mixture. The solvent most often is introduced at a point at or near the top of the column. Generally, it will be preferred that the feed mixture be introduced at a point in the fractionating column of from one-fifth of one-third of the height of the column from the bottom of the column and that the solvent be introduced at a point no greater than one-third of the height of the column from the top of the column.

The quantity of solvent required in the present extractive distillation process in order to accomplish the desired separation will vary over relatively wide limits depending upon the efficiency of the separation desired and the equipment used. Generally, no less than 1 part by volume of solvent per part by volume of feed mixture will be used. The quantity of solvent may range as high as 10 to 20 volumes per volume of feed mixture. When practicing the present invention according to its preferred mode of practice as dilution of the internal reflux becomes infinite, separation becomes sharper but operating efficiency is lowered considerably because of the relatively small quantity of feed mixture being processed as infinite reflux is approached. Too large an excess of solvent is, therefore, to be avoided in this preferred mode of practice.

The reflux ratio at which the column is operated will vary according to the theoretical plate efficiency of the column, the solvent to feed ratio, composition of the feed mixture and separation desired. Generally, however, reflux ratios of 0.01:1 to 20:1 will suffice. It is preferred, however, that the reflux ratio be within the range of 0.5:1 to 5:1.

The present extractive-distillation process may be carried out at atmospheric pressure or at subatmospheric pressures as well as at superatmospheric pressures. Generally, pressures within the range of from atmospheric up to 5 to 100 p.s.i.a. will be used. It will generally be preferred, however, that the pressure be at or near atmospheric pressure, i.e., 1 to 10 p.s.i.g.

The feed mixtures which may be separated according to the present invention are organic mixtures comprised of alkyl halides and hydrocarbons which are difficultly separable therefrom. The hydrocarbons may be aromatic or aliphatic, but preferably are aliphatic. If aliphatic, the hydrocarbons may be cyclic or non-cyclic, saturated or unsaturated, straight or branched chain. The present invention is most useful in separating mixtures comprised of alkyl halides having 2 to 10 carbon atoms and unsaturated aliphatic hydrocarbons, which mixtures are difficultly separable by distillation. The alkyl group of the alkyl halides is either a straight chain or a branched chain alkyl group. A particularly preferred utility for the present invention is in the separation of mixtures of alkyl monohalides, particularly alkyl mono-bromides, having 2 to 10 carbon atoms and mono-olefin hydrocarbons which mixtures are difficultly separable by distillation.

In choosing the proper solvent for affecting a particular separation in accordance with the present invention, it is necessary to consider the boiling points of the solvent and of the alkyl halides and hydrocarbons in the feed mixture to be separated. The solvent chosen must, of course, have a higher boiling point than either of the organic compounds in the mixture to be separated.

As previously indicated, the vapor pressure of the alkyl halides is lowered when in the presence of the solvent and is retained in solution with the solvent and is thus removed from the extractive distillation unit with the solvent. The alkyl halides are readily recovered from the solvent by a simple flash distillation, the alkyl halides being recovered as overhead distillate.

Any conventional distillation equipment may be utilized for effecting the recovery of the alkyl halides from the solvent. After the alkyl halides are recovered from the solvent, the solvent may then be recycled or reused in further extractive distillation.

What is claimed is:

1. A process for the separation of mixtures of alkyl mono-bromides and hydrocarbons which are difficultly separable therefrom comprising extractively distilling said mixture in the presence of a solvent comprising a di-ester of phthalic acid, recovering an overhead distillate fraction from said distillation substantially richer in hydrocarbon concentration than said original mixture, removing the alkyl mono-bromides rich solvent fraction from said distillation and recovering from said alkyl mono-bromides rich solvent a fraction substantially richer in alkyl mono-bromides concentration than said original mixture.

2. The process of claim 1 wherein the volume ratio of solvent to feed is at least 1:1.

3. The process of claim 1 wherein the hydrocarbons are mono-olefin hydrocarbons.

4. The process of claim 1 wherein the alkyl mono-bromides are of 2 to 10 carbon atoms.

5. The process of claim 1 wherein the solvent is a di-ester of phthalic acid having the formula

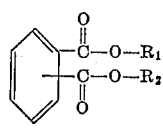

wherein $R_1$ and $R_2$ are alkyl groups of 1 to 10 carbon atoms.

6. The process of claim 5 wherein the di-ester of phthalic acid is selected from the group consisting of ortho-di-esters of phthalic acid, meta-di-esters of phthalic acid and para-di-esters of phthalic acid.

7. The process of claim 5 wherein $R_1$ and $R_2$ are alkyl groups of 1 to 6 carbon atoms.

8. The process of claim 5 wherein the solvent is an ortho-di-ester of phthalic acid and wherein $R_1$ and $R_2$ are straight-chain alkyl groups of 1 to 3 carbon atoms.

9. A process for the separation of mixtures comprising alkyl mono-bromides and hydrocarbons which are difficultly separable therefrom, said process comprising continuously introducing said mixture into an intermediate section of a fractionating column, continuously introducing a solvent into the fractionating column at a point above the point of introduction of said mixture so that the solvent flows countercurrent to and intimately contacts the ascending vapors of the mixture, withdrawing overhead hydrocarbons substantially free of alkyl mono-bromides, and removing from the bottom section of said column a solution of alkyl mono-bromides and solvent, said solvent introduced into said fractionating column being a di-ester of phthalic acid.

References Cited by the Examiner

UNITED STATES PATENTS

| | | | |
|---|---|---|---|
| 2,357,028 | 8/1944 | Shiras et al. | 203—60 X |
| 3,013,953 | 12/1961 | Frazer | 203—60 X |
| 3,042,728 | 7/1962 | Hirsh et al. | 260—662 |
| 3,219,546 | 11/1965 | Fannin et al. | 203—60 |
| 3,220,933 | 11/1965 | Amir et al. | 203—60 |

NORMAN YUDKOFF, *Primary Examiner.*

WILBUR L. BASCOMB, JR., *Examiner.*